United States Patent [19]

Matsuka et al.

[11] Patent Number: 5,372,764
[45] Date of Patent: Dec. 13, 1994

[54] METHOD OF MAKING OLEFIN SYNTHETIC RESIN EXPANSION MOLDED ARTICLES

[75] Inventors: Kiyoshi Matsuka, Nishinomiya; Yoshiaki Yawata, Takasago, both of Japan

[73] Assignee: Kanegafuchi Kagaku Kogyo Kabushiki Kaisha, Osaka, Japan

[21] Appl. No.: 842,170

[22] PCT Filed: Aug. 6, 1991

[86] PCT No.: PCT/JP91/01047

§ 371 Date: Apr. 3, 1992

§ 102(e) Date: Apr. 3, 1992

[87] PCT Pub. No.: WO92/02358

PCT Pub. Date: Feb. 20, 1992

[30] Foreign Application Priority Data

Aug. 6, 1990 [JP] Japan .................................. 2-208820
Aug. 6, 1990 [JP] Japan .................................. 2-208821
Nov. 9, 1990 [JP] Japan .................................. 2-304830

[51] Int. Cl.$^5$ .............................................. B29C 67/20
[52] U.S. Cl. .............................. 264/50; 264/51; 264/DIG. 16
[58] Field of Search ................... 521/56, 60; 264/50, 264/51, 53, 55, DIG. 16

[56] References Cited

U.S. PATENT DOCUMENTS

| 2,965,585 | 12/1960 | Delap et al. | 264/50 |
| 3,159,693 | 12/1964 | Plymale | 264/53 |
| 4,448,901 | 5/1984 | Senda et al. | 264/53 |
| 4,720,509 | 1/1988 | Nakamura | 264/DIG. 16 |
| 4,800,050 | 1/1989 | Hahn et al. | 264/51 |
| 4,818,451 | 4/1989 | Arai et al. | 264/51 |
| 4,929,645 | 5/1990 | Moll et al. | 521/56 |

FOREIGN PATENT DOCUMENTS

| 56-077122 | 6/1981 | Japan | 264/53 |
| 899389 | 6/1962 | United Kingdom | 264/50 |

*Primary Examiner*—Allan R. Kuhns
*Attorney, Agent, or Firm*—Armstrong, Westerman, Hattori, McLeland & Naughton

[57] ABSTRACT

A large-sized in-mold expansion-molded article of an olefin synthetic resin having 150 mm or more in thickness, 50% or more in fusion ratio and 10% or less in density distribution is disclosed. The expansion-molded article is obtainable by adoption of a process in which pre-expanded beads are charged into a mold, preheated and steamed before molding. Large-sized expansion-molded article of an olefin synthetic resin 500 mm or even more in thickness is obtainable by the present invention.

11 Claims, 2 Drawing Sheets

METHOD OF MAKING OLEFIN SYNTHETIC RESIN EXPANSION MOLDED ARTICLES

FIELD OF THE INVENTION

The present invention relates to expansion-molded articles of olefin synthetic resins such as ethylene and propylene type synthetic resins and manufacturing method thereof.

PRIOR ART

Expansion molded articles of polystyrene and olefin synthetic resins represented by, for example, polyethylene synthetic resin and polypropylene synthetic resin with their features such as cushioning property, chemical stability, good moldability and lightness have had various uses such as wrapping materials, packing materials and cushioning materials.

The known methods of manufacturing such expansion-molded articles are roughly divided into extrusion molding method and in-mold molding method by the use of pre-expanded beads. With polystyrene expansion-molded articles, for instance, manufacturing methods have roughly been divided into extrusion-type expansion-molding method for heat insulation materials such as building materials, and in-mold expansion-molding method for cushioning materials, packing materials and the like, and each of the manufacturing techniques has almost reached the point of ripening.

With olefin expansion-molded articles represented by, for example, polyethylene and polypropylene synthetic resins, however, there still remain, especially in in-mold expansion-molded articles, many unsolved problems such as method of manufacturing pre-expanded beads and expansion-molding method.

As in-mold expansion-molding type of manufacturing method, there has been known a method of charging pre-expanded beads of synthetic resin into a mold made up of a male member and a female member capable of opening or closing with respect to each other and also capable of forming a cavity when fitted together, introducing water vapor into the mold interior for heating and fusing the pre-expanded beads to form an expansion-molded article and taking the molded article out of the mold after cooling.

The mold used in this method has made therein a large number of water vapor holes for introducing water vapor which heats and fuses the pre-expanded beads charged in the mold, while the pre-expanded beads charged in the mold are subjected to heating by the water vapor introduced through the above-mentioned holes, this giving rise to re-expansion of the pre-expanded beads such that the inter-beads gaps are filled for the beads to be adhered to one another and fused together to form an expansion-molded article.

The technical problems given rise to by such a molding method include, among others:

(1) Since heating of the pre-expanded beads is effected by means of the water vapor introduced into the mold, heating progresses from outside of the beads charged in the mold and in contact therewith, this causing a difference in the degree of inter-beads fusing between the outer layer of the molded article and the core portion thereof; and (2) Since the inter-beads fusing progresses as the pre-expanded beads reexpand in such a manner that the inter-beads gaps are filled, the degree of inter-beads fusing is influenced by the presence and the amount of substances which interfere with inter-beads fusion.

In other words, the problem is essentially how the pre-expanded beads charged in the mold can be heated uniformly and how the water vapor can be supplied continuously to the core portion of the mold interior with the drop in temperature minimized. The importance of this problem increases with increasing thickness of the expansion-molded article.

In order to solve the problems for improvement in product quality as well as producibility, continuous efforts have been made for technological improvement mainly about polystyrene expansion-molded articles. For example, there have been proposed a method in which the pressure in a mold is reduced by evacuation (deaeration) to a half-atmospheric level, the air remaining in the mold is further evacuated through replacing with water vapor supplied alternately through water vapor supply pipes and then water vapor is introduced into the mold interior for heating and fusion of the pre-expanded beads (Japanese Patent Publication No. 45940/1986), a method of introducing a large amount of water vapor in a short period of time in the fusing step (2–10 kg/second) (Japanese Laid-open Patent Publication No. 116432/1985), a method of first preheating a mold, then charging pre-heated, pre-expanded beads thereinto by means of hot air and thereafter heating for fusion of charged beads by introducing water vapor (Japanese Laid-open Patent Publication No. 77122/1981), a method of reducing the pressure in the mold charged with pre-expanded beads to a half-atmospheric level before introducing water vapor thereinto for fusion by heating of the pre-expanded beads (Japanese Patent Publication No. 51890/1984) and a method of first charging pre-expanded beads into a mold and introducing a liquid whose temperature is higher than water vapor but below the molding temperature for the above-mentioned beads before heating the beads with the water vapor so as to evacuate the gas existing among the charged beads and then discharging the above-mentioned liquid and introducing the water vapor into the mold for heating and fusing the pre-expanded beads (Japanese Laid-open Patent Publication No. 191123/1987). Each of these method proposes an effective solution for the individual problems posed and they are all significant as improved methods for in-mold molding of polystyrene type pre-expanded beads.

In the in-mold molding method for pre-expanded beads of olefin synthetic resins represented by, for example, polyethylene and polypropylene type synthetic resins, adoption of such approaches does not necessarily give preferable results because of their narrow range of proper molding temperature common with pre-expanded beads of crystalline resins. Hence, when the manufacturing technique for in-mold molded articles by the use of olefin pre-expanded beads is compared with that for in-mold molded articles by the use of styrene type pre-expanded beads, the difference is noted significantly in the region especially where the thickness of the molded article is large. Currently, therefore, the situation is such that the thickness of in-mold molded articles attainable with olefin pre-expanded beads is about 100 mm at most, and so far a molding thickness of, for example, 500 mm, which is now common with styrene type in-mold molded article, has been unattainable.

The object of the present invention is to provide a large-sized expansion-molded article thicker than 100 mm.

In view of the current situation, the present inventors made intensive studies and found out that the above-mentioned object was attainable when specific preheating and steaming steps were provided after charging pre-expanded beads into a mold.

DISCLOSURE OF THE INVENTION

The present invention relates to an expansion-molded article of an olefin synthetic resin not less than 150 mm in thickness prepared by in-mold expansion-molding.

For manufacturing said expansion-molded article, the present invention relates to a method for manufacturing an in-mold expansion-molded article in which olefin pre-expanded beads having at least one melting point when determined by differential scanning calorimeter are charged into a mold closable but not closable gas-tight and the pre-expanded beads are heated with water vapor to be swelled and fused into the shape defined by the mold, comprising the steps of:

introducing water vapor into the mold to heat the pre-expanded beads to a predetermined preheating temperature $(T_\gamma)°C$. below the fusion temperature of the pre-expanded beads after charging the pre-expanded beads into the mold, stopping the introduction of water vapor for steaming the pre-expanded beads For a predetermined time, removing water vapor and/or drain among the pre-expanded beads in the mold, introducing water vapor into the mold to keep the temperature in the mold at a level higher than the preheating level to thus heat and melt the pre-expanded beads to form an expansion-molded article, and leaving it to stand in the atmosphere and/or cooling it with a cooling medium.

The present invention further relates to a method for manufacturing an in-mold expansion-molded article in which olefin pre-expanded beads having at least one melting point when determined by differential scanning calorimeter are charged into a mold closable but not closable gas-tight and the pre-expanded beads are heated with water vapor to be swelled and fused into the shape defined by the mold, comprising the steps of:

introducing water vapor into the mold to heat the pre-expanded beads to a predetermined preheating temperature $(T_\gamma)°C$. below the fusion temperature of the pre-expanded beads after charging the pre-expanded beads into the mold, continuing the introduction of water vapor for steaming to proceed for a predetermined time at a temperature within a predetermined range below the fusion temperature of the pre-expanded beads, introducing water vapor, without removing water vapor and/or water among the pre-expanded beads in the mold, into the mold to keep the temperature in the mold at a level higher than the preheating level to thus heat and melt the pre-expanded beads to form an expansion-molded article, and leaving it to stand in the atmosphere and/or cooling it with a cooling medium.

BEST MODE OF EMBODYING THE INVENTION

Figure 1:
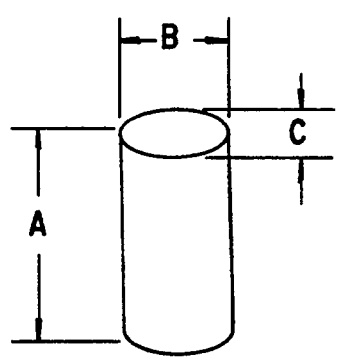
FIGS. 1–5 are schematic views of each example of molded articles showing its thickness and FIG. 6 is a schematic view showing an example of equipment used for the manufacture of a large expansion-molded article of the present invention.
Figure 2:
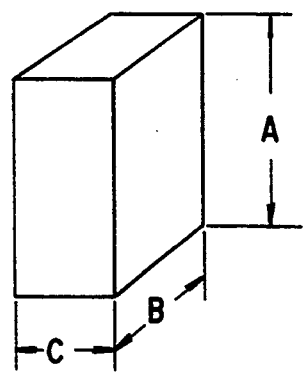
Figure 3:
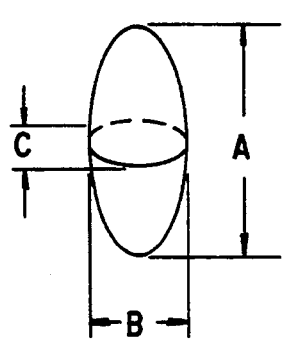
Figure 5:
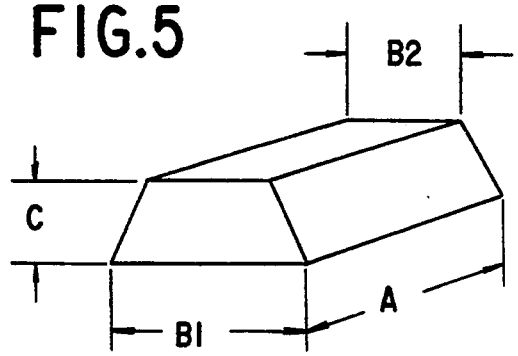
Figure 4:
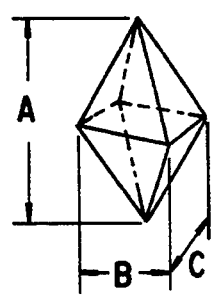

In this invention, the thickness of an article of expansion-molded article may be as usually recognized by those skilled in the art but, it may be defined as the shortest of the three dimensions along X, Y and Z axes. Exemplified by typical figures, with those in FIGS. 1–4, the thickness of each expansion-molded article is taken to be the shortest of the three sides A, B and C, while with that in FIG. 5, the shortest of the three sides A, B and C is taken as the thickness with B defined as $(B1+B2)/2$.

As olefin synthetic resin of the present invention may be included, among others, low-density polyethylene, medium-density polyethylene, high-density polyethylene, linear low-density polyethylene, ethylene-vinyl acetate copolymer, propylene homopolymer, ethylene-propylene random copolymer, ethylene-propylene block copolymer, ethylene-butene-propylene random terpolymer, propylene-vinyl chloride copolymer, propylene-butene copolymer, propylenemaleic anhydride copolymer, poly(butene-1), other thermoplastic resins miscible with some of the above-mentioned propylene type resins such as low-density polyethylene, linear low-density polyethylene, vinyl aromatic type polymers, polybutene and ionomers used mixed with propylene type resins, and other thermoplastic resins miscible with some of the above-mentioned ethylene type resins such as vinyl aromatic polymers, polybutene and ionomers used mixed with ethylene type resins.

The mixing method includes mechanical methods by the use of mixers such as extruders and chemical methods such as prepolymerization by impregnation of polymer particles or pellets with a second or third component. When, for example, a vinyl group-containing aromatic polymer is used for prepolymerization by impregnation quoted as an example of the chemical method, it is also possible to use as the second component a small amount of a monomer copolymerizable with the monomer and as the third component may be used, for example, acrylonitrile, acrylic ester, methacrylic ester, divinyl benzene, maleic mono- or di-aryl. As vinyl group-containing aromatic polymer may be included, besides styrene, nucleus-substituted styrene such as methyl styrene, ethyl styrene and dimethyl styrene, α-substituted styrenes such as α-methyl styrene. Olefin pre-expanded beads are usable regardless of crosslinkage but non-crosslinked ones are preferred economically.

The aforementioned olefin synthetic resins have at least one melting point when measured with differential scanning calorimeter and include those having two melting points.

As large-sized expansion-molded articles of the present invention may be included those block-shaped expansion-molded article with 150 mm or more, preferably 300 mm or more and still more preferably 500 mm or more in thickness.

Expansion-molded articles of the present invention are 50% or more, preferably 60% or more and still more preferably 70% or more in fusion ratio and 10% or less in density distribution. If the fusion ratio is less than 50%, it results in an insufficient strength of the expansion-molded article, while, if the density distribution is in excess of 10%, it results in an increased scattering in quality of expansion-molded articles such as cushioning performance.

The expansion-molded articles of the present invention can be manufactured easily by the following alternative methods (A) and (B).

(A) A method in which first pre-expanded beads are charged into a mold and then after the specific preheating and steaming steps, expansion-molded articles are manufactured in subsequent steps, namely water-removing step, heating step, cooling step, leaving-to-cool step and taking-out step.

(B) A method as described above in (A) without the water-removing step.

The above-mentioned method (A) may be divided into two alternatives of (A-1) and (A-2).

(A-1)

A method in which olefin pre-expanded beads having at least one melting point when measured by differential scanning calorimeter charged in a closable but not closable gas tight mold are expanded to fuse together by heating with water vapor for molding in a shape defined by the mold, characterized in that water vapor is let into the mold after charging the above-mentioned pre-expanded beads thereinto for preheating to a predetermined level $(T_\gamma)°C.$ below the fusing temperature of the pre-expanded beads, then after steaming for a predetermined period of time with the introduction of water vapor stopped, water vapor and/or water among the charged beads are removed, introduction of water vapor is thereafter resumed to thereby fuse the pre-expanded beads to form an expansion-molded article and then allow it to stand in the atmosphere and/or cool it with a cooling medium.

(A-2)

A method in which after raising the temperature to a predetermined preheating level $(T_\gamma)°C.$ in the same way as described in (A-1) above, introduction of water vapor is continued to thereby keep the temperature inside the mold for a predetermined period of time within a predetermined range for steaming, then water vapor and/or water among the charged beads are removed, thereafter water vapor is introduced into the mold to keep the temperature inside at a level higher than the preheating temperature to thereby fuse the pre-expanded beads to form an expansion-molded article and allow it to stand in the atmosphere and/or cool it with a cooling medium.

The above-mentioned methods (A-1) and (A-2) will be described below in greater detail.

The preheating step is a step for preheating, prior to heating, the pre-expanded beads to the highest temperature possible without causing fusion thereof and the range of preheating temperature $(T_\gamma)°C.$ is $T_{ML}-30°C. \leq T_\gamma \leq T_{ML}+5°$ C., preferably $T_{ML}-30°C. \leq T_\gamma \leq T_{ML}$ and still more preferably $T_{ML}-25°C. \leq T_\gamma < T_{ML}-5°$ C. In the above-mentioned equations $T_{ML}$ is the melting point measured by differential scanning calorimeter, but the lowermost one when there are two or more melting points. If the preheating temperature is lower than $(T_{ML}-30°$ C.), no sufficient effect of heating is obtainable, while, if it is higher than $(T_{ML}+5°$ C.), fusion of pre-expanded beads starts during pre-heating, this resulting in difficulty of water vapor reaching the central portion of the molded article.

By the melting point measured by differential scanning calorimeter is meant the endothermic peak temperature under the following conditions, and when there are measured a plurality of endothermic peaks, the melting point $(T_{ML})$ Of the present invention means the lowermost one. Melting point measurement is done by the use of an ordinary differential scanning calorimeter such as Parkin-Elmer's Model DSC-2 or Rigaku Denki's Model TAS-100, the sample being 1-10 mg of pre-expanded beads and the heating rate being 10° C./minute.

As a method for measuring the temperature of pre-expanded beads in the preheating step is known planting of needle-like fine thermal sensor on both or either of the inner surfaces of the male and female members of the mold, that is, on the side or sides to be in contact with the pre-expanded beads. In this method the position where the temperature is measured is determined by the length of the sensor, being normally 1-150 mm, preferably 3-100 mm and still more preferably 3-50 mm inward of the inner surface of the mold so that the temperature preferably 5 mm or more and still more preferably 10 mm or more inward are measurable although it also depends on the thickness of the molded article. The kind of the sensor is not limited in this invention, and any ordinary sensor such as a thermistor is usable. The method of measuring the temperature of pre-expanded beads is not limited to the above-mentioned one and various combinations of the known techniques are feasible.

There is no particular limitation with regard to the mode of introducing water vapor in the preheating step and any of the methods commonly in use may be usable.

Unlike the conventional methods in which the temperature of the thermal medium (or water vapor pressure) is controlled, the preheating step of this process consists in directly detecting the temperature of the object to be heated (pre-expanded beads) and/or the ambient temperature, hence there is a merit of no high precision being required in setting the temperature of the thermal medium through control of the water vapor pressure.

The steaming step is for heating the pre-expanded beads to a still higher temperature without causing fusion thereof by imparting enough thermal energy to the beads through uniformalization of the temperature inside the beads as well as the inter-beads temperature.

For this steaming there are two alternative methods (A-1) and (A-2) methods. Of these alternatives, (A-1) is a method in which (a) the pre-expanded beads in the mold are first heated to the pre-heating level and then, with introduction of water vapor stopped, the beads are allowed to be steamed for a predetermined period of time, while (A-2) is a method in which (b) the pre-expanded beads in the mold are first heated to the pre-heating level and then, introduction of water vapor is continued to keep the beads in the preheating range of temperature for a predetermined period of time for steaming the beads, and (c) the pre-expand beads are first heated to the preheating level and after steaming with the temperature in the pre-heating range with introduction of water vapor continued (steaming step I) and steaming is continued for a predetermined period of time with the introduction of water vapor stopped (steaming step II).

The proper steaming time $(T_M)$ is 5 seconds $\leq T_M \leq 7$ minutes but in the method (a) it is preferably 10 seconds $\leq T_M \leq 6$ minutes and more preferably 20 seconds $\leq T_m \leq 5$ minutes, in the method (b) it is preferably 5 seconds $\leq T_M \leq 2$ minutes and more preferably 7 seconds $\leq T_M \leq 60$ seconds, and in the method (c) the steaming step II is provided to follow the steaming step I, and, hence the time of the steaming step I may be shorter than in case of the method (b).

Of the methods (a), (b) and (c), the method least in water vapor consumption is (a), but this method is tendentiously longer in the time required for steaming. Meanwhile, the method (b), which has the steaming step included in the preheating step, the preheating time tends to be short but, at the same time, the water vapor consumption tends to be the largest of the three methods. It is therefore advisable to do selection with balance of the water vapor consumption and the molding cycle time taken into due consideration, but the method (a) or (b) is considered advantageous when emphasis is placed on energy saving.

The water-removing step, which follows the preheating and the steaming steps, is for removing the water vapor and/or water remaining among the pre-expanded beads so as to enhance infiltration of heated water vapor in the heating step. As the water vapor and/or water removing method, there are included such methods as reducing pressure in the mold and inflowing into either of the mating molds or flowing out thereof, but it is not limited thereto.

When, for instance, water is removed by reducing the pressure inside the mold, the absolute pressure is required to be 400 mmHg or less, preferably 250 mmHg or less and more preferably 150 mmHg or less.

As to the operation following heating for fusion of the pre-expanded beads, there is no particular limitation in the present invention and any of the conventional methods is applicable, but it is advisable to do heating by measuring the temperature of the pre-expanded beads and controlling the heating temperature and heating time also in the heating step. The heating temperature ($T_H$) may possibly be in a range of $T_{ML}-10°$ C. $\leq T_H \leq T_{ML}+15°$ C., preferably $T_{ML}-7°$ C. $\leq T_H \leq T_{ML}+10°$ C., and more preferably $T_{ML}-5°$ C. $\leq T_H \leq T_{ML}+7°$ C. The heating time is normally in a range of 3–90 seconds but a better result is obtainable in the quality of molded article and stability of step through control of the heating time according to the variation of the resin temperature.

In a preferable example of the heating control method, heating is started and stopped when the temperature, after it rose to be in the predetermined range, has started lowering to be off the above-mentioned range with heating being continued. Another preferred method is to stop heating when the temperature of the pre-expanded beads has dropped 1°–5° C. from the peak reached in the heating step for improvement of heating efficiency, energy-saving or shortening the cycle time.

The (B) method above, too, has two alternatives of (B-1) and (B-2).

(B-1)

After reaching the pre-heating level ($T_y$)°C. in the same way as in (A-1) and (A-2), introduction of water vapor is continued for steaming for a predetermined time in a predetermined range of temperature and, thereafter, water vapor of a still higher temperature is introduced into the mold for fusion of the pre-expanded beads without removing the water vapor and/or water among the beads charged in the mold.

(B-2)

After reaching the pre-heating level ($T_y$)°C. in the same way as described in (B-1), introduction of water vapor is continued for steaming for a predetermined period of time in a predetermined range of temperature and, then, introduction of water vapor is stopped for further steaming with The temperature kept for a predetermined period of time, thereafter water vapor of a still higher temperature is introduced into the mold interior for maintaining the temperature in the mold higher than the preheating level to thereby fuse the pre-expanded beads to form an expansion-molded article and allow it to stand in the atmosphere and/or cool it with a cooling medium.

As the steaming method, there are two alternatives of (B-1) in which the pre-expanded beads charged into the mold are steamed by keeping their temperature within a predetermined range for a predetermined period of time while contunuing introduction of water vapor, and (B-2) in which after heating the pre-expanded beads to a preheating level, introduction of water vapor is continued for keeping the temperature of the pre-expanded beads within the mold in the preheating temperature for a predetermined period of time to thereby effect steaming (steaming step I) and then steaming is further continued by stopping introduction of water raper or by maintaining the pre-expanded beads for a predetermined period of time with introduction of water vapor stopped (steaming step II).

Proper steaming time ($T_M$) is 5 seconds $\leq T_M \leq 5$ minutes but in the method (B-1) it is preferably 15 seconds $\leq T_M \leq 3$ minutes, more preferably 20 seconds $\leq T_M \leq 2$ minutes, and in the method (B-2), in which the steaming step I is followed by the steaming step II, the steaming step I may possibly be shorter than in the method (B-I).

There is no particular limitation about the method of manufacturing the pre-expanded beads, hence any of the conventional methods may be used, for example, a method in which a monomer is dispersed in an aqueous medium charged in a tightly closed container together with auxiliaries such as a polymerization initiator and during or after polymerization, impregnation is carried out with a volatile expanding agent and the like, this followed by heating and expansion of the resin particles by hot air or the like (for example, Japanese Laid-open Patent No. 284536/1989) or a method used for manufacturing pre-expanded beads of an olefin synthetic resin in which pellets of olefin synthetic resin are dispersed in an aqueous medium in a tightly closed container and after impregnation thereof with a volatile expanding agent under heating, the above-mentioned pellets are heated and expanded by hot air or the like, and a further method in which, as described in Japanese Patent Publication No. 1344/1981 and Japanese Laid-open Patent Publication No. 106938/1987, polymer particles containing a volatile expanding agent are dispersed in water filled in tightly closed container and, with the pressure in the container being maintained at the vapor pressure or higher of the volatile exanding agent, the temperature is raised to or above the softening point of the polymer, thereafter an outlet below the water surface is opened for simultaneous discharge of the polymer particles and water into atmosphere whose pressure is lower than that in the container for obtaining pre-expanded beads.

There is no particular limitation, either, about the method of forming pre-expanded beads and any of the conventional methods so far used for in-mold expansion-molding of olefin or styrene type synthetic resins. For example, a method in which a gas for expanding is added to the pre-expanded beads for imparting to the beads an internal pressure as described in Japanese Patent Publication No. 22951/1976, another method in which the pretreatment of imparting the internal pressure is dispensed with, as described in Japanese Patent Publication No. 7816/1980 and still a further method in which, as described in Japanese Laid-open Patent Publication No. 33996/1978, the pre-expanded beads are compressed by gas pressure to be lower in apparent volume than the original untreated pre-expanded beads, then charged in a mold and heated for fusion of the beads. According to Japanese Patent Publication No, 33996/1978, the compression ratio is 80% or less of the apparent volume of the orginal untreated pre-expanded beads, but the present invention is applicable to where the compression ratio is 100% or less in original untreated volume, preferably 95% or less and still more preferably 80% or less so as to be applicable where pre-expanded beads are used as described in Japanese Patent Publication No. 7816/1980 and the method proposed in Japanese Patent Publication No. 33996/1978 is used for molding.

This invention is, however, not applicable where melting point is not measurable due to the manufacturing method or manufacturing conditions for the above-mentioned olefin synthetic resin or pre-expanded beads.

Hereinafter a specific manufacturing method for a large expansion-molded article of the present invention will be described in detail with reference to the annexed drawings.

Figure 6:
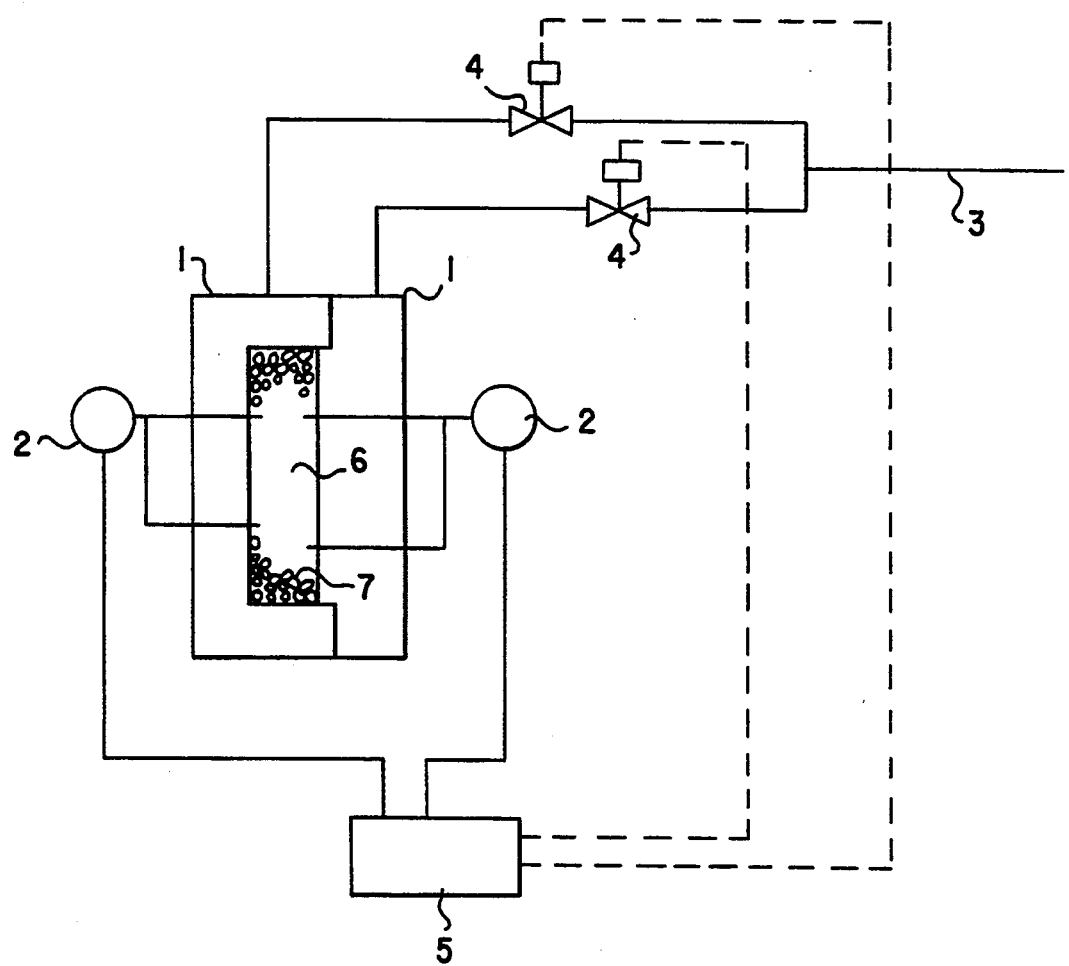

FIG. 6 shows a schematic view of an example of manufacturing apparatus comprising a mold 1, a thermometer 2 and a water vapor supply pipe 3, and the water vapor supply pipe 3 is equipped with a valve 4. The thermometer 2 detects the temperature and inputs the result and the valve 4 opens and closes following the sequence as determined by a sequencer 5.

In molding, first a pre-expanded beads such as olefin pre-expanded beads 7 like ethylene type, are charged into a molding space 6 and the surplus beads are blown back. The pre-expanded beads being thus charged, heated water vapor is introduced through the water vapor supply pipe 3 into a jacket of the mold 1 and then into the molding space 6 for heating and fusing the pre-expanded beads 7 in the molding space 6 into an expansion-molded article, which is a conventional molding method.

In contrast thereto, in a method (A) the pre-expanded beads 7 are preheated to a non-fusing temperature, the supply of water vapor is stopped when the predetermined temperature has been reached and the temperature is kept for a predetermined time for steaming. After the lapse of the predetermined time, the pressure in the mold is lowered suddenly by means of a vacuum pump, vacuum tank or the like for removal of water vapor and/or water among the pre-expanded beads. Then it is of great importance to complete the water-removal step as soon as possible for minimizing the drop of the temperature of the beads 7.

The pre-expanded beads 7 thus preheated, steamed and removed water are then heated to the melting point by introduction of water vapor for a predetermined time for further heating and fusion of the beads 7. After the heating and fusion, the resulting expansion-molded article is precooled by a usual method and after cooling by supply of a cooling media such as cold water, the expansion-molded article is taken out of the mold.

In an alternative method (B), first the pre-expanded beads 7 are preheated in the same manner as described in the method (A) to the predetermined level below the fusion temperature, the supply of water vapor is continued until the temperature of the beads 7 reaches the predetermined level and the temperature is kept in a predetermined range for the predetermined time to conduct steaming. Thereafter, immediately after stopping the supply of water vapor or after steaming by leaving as it is for the predetermined time for further steaming, heating, cooling and taking out of the expension-molded article from the mold are done without removal of water vapor and/or water as in the case of (A).

According to the method of the invention, the steps of preheating and heating may be divided into a plurality of substeps. For example, in the heating step the supply of water vapor may be done in normal and inverse order and/or from both sides.

Hereinafter the invention will be explained by way of examples and comparative examples, but it is to be noted that these do not limit the scope of the invention.

EXAMPLE 1

An aluminum mold (1000 mm width×2000 mm length×500 mm thickness) and linear low density polyethylene pre-expanded beads (Kanegafuchi Chemical Industry Co., Ltd., Eperan-XL, melting point $T_{ML}=118°$ C. on the lower temperature side as measured by differential scanning calorimeter, expansion ratio=38) were used. After heating the pre-expanded beads to a preheating level of 115° C. introduction of water vapor was stopped and after allowing to stand for steaming for 100 seconds and subsequent water removal, expansion-molded articles were obtained by heating, cooling, allowing to stand for cooling and taking-out of the mold.

EXAMPLE 2

Expansion-molded articles were obtained in the same way as in Example 1 except that after heating the pre-expanded beads to the preheating level, the preheating temperature of 113° C. was kept for 3 seconds with supply of water vapor continued for steaming, and further steaming was made for 60 seconds by leaving them to stand under these conditions with supply of water vapor stopped.

EXAMPLE 3

Expansion-molded articles were obtained in the same way as Example 1 except that after heating the pre-expanded beads to the preheating level, the preheating temperature of 113° C. was kept for 7 seconds for steaming with supply of water vapor continued.

EXAMPLE 4

Expansion-molded articles were obtained in the same way as in Example 1 except that the thickness of the aluminum mold was changed to 150 mm, the steaming time being also changed to 30 seconds and the heating time being changed to 5 seconds.

EXAMPLE 5

Expansion-molded articles were obtained in the same way as in Example 1 except that the thickness of the aluminum mold was changed to 300 mm, the steaming time being also changed to 40 seconds and the heating time being changed to 7 seconds.

EXAMPLE 6

Expansion-molded articles were obtained in the same way as in Example 1 except that the thickness of the aluminum mold was changed to 800 mm, the preheating temperature being changed to 114° C., the steaming time being also changed to 120 seconds and the heating time being changed to 15 seconds.

Comparative Example 1

Expansion-molded articles were obtained in the same way as in Example 1 except the temperatures in the preheating step and heating step were changed.

Comparative Example 2

Expansion-molded articles were obtained in the same way as in Example 1 except that the steaming step was dispensed with.

Comparative Example 3

Expansion-molded articles were obtained in the same way as in Example 1 except that the preheating temperature was changed ant the steaming step being dispensed with.

Comparative Example 4

Expansion-molded articles were obtained in the same way as in Example 1 except that the preheating temperature was changed and the steaming step being dispensed with.

The appraisal of the appearance of expansion-molded articles immediately after molding, fusion ratio, dimensional stability, density distribution, quality and overall appraisal were made of the expansion-molded articles of the aforementioned Examples 1–6 and Comparative Examples 1–4. The results were as shown in Table 1A and 1B.

TABLE 1A

|  |  | Example 1 | Example 2 | Example 3 | Example 4 | Example 5 | Example 6 |
|---|---|---|---|---|---|---|---|
| Molding conditions | Resin | Polyethylene | Polyethylene | Polyethylene | Polyethylene | Polyethylene | Polyethylene |
|  | Thickness of molded articles | 500 mm | 500 mm | 500 mm | 150 mm | 300 mm | 800 mm |
|  | Conditions | A-1 (a) | A-2 (c) | A-2 (b) | A-1 (a) | A-1 (a) | A-1 (a) |
|  | Preheating step | 115° C. | 113° C. | 113° C. | 115° C. | 115° C. | 114° C. |
|  | Steaming step | 100 sec | I: 3 sec<br>II: 60 sec | 7 sec | 30 sec | 40 sec | 120 sec |
|  | Water-removing step | 150 mm Hg | 150 mm Hg | 150 mm Hg | 150 mm Hg | 150 mm Hg | 150 MmHg |
|  | Heating | 119° C.<br>10 sec | 119° C.<br>10 sec | 119° C.<br>10 sec | 119° C.<br>5 sec | 119° C.<br>7 sec | 119° C.<br>15 sec |
| Quality | Appearane of molded article immediately after molding | ○ | ○ | ○ | ○ | ○ | ○ |
|  | Fusion ratio | ○~◉ | ○~◉ | ○~◉ | ○~◉ | ○~◉ | ○~◉ |
|  | Dimensional stability | ○ | ○ | ○ | ○ | ○ | ○ |
|  | Densityal distribution | ○ | ○ | ○ | ○ | ○ | ○ |
|  | Quality | ○ | ○ | ○ | ○ | ○ | ○ |
| Overall appaisal |  | ○ | ○ | ○ | ○ | ○ | ○ |

TABLE 1B

|  |  | Comparative Example 1 | Comparative Example 2 | Comparative Example 3 | Comparative Example 4 |
|---|---|---|---|---|---|
| Molding conditions | Resin | Polyethylene | Polyethylene | Polyethylene | Polyethylene |
|  | Thickness of molded articles | 500 mm | 500 mm | 500 mm | 500 mm |
|  | Conditions | — | — | — | — |
|  | Preheating step | 125° C. | 115° C. | 105° C. | 118° C. |
|  | Steaming step step | 100 seconds | — | — | — |
|  | Heating | 130° C.<br>10 sec | 119° C.<br>10 sec | 119° C.<br>10 sec | 119° C.<br>10 sec |
| Quality | Appearane of molded article immediately after molding | ○ | Δ | x | Δ~○ |
|  | Fusion ratio | x | x | x | x |
|  | Dimensional stability | — | — | — | — |
|  | Densityal distribution | — | — | — | — |
|  | Quality | — | — | — | — |

TABLE 1B-continued

|  | Comparative Example 1 | Comparative Example 2 | Comparative Example 3 | Comparative Example 4 |
|---|---|---|---|---|
| Overall appaisal | x | x | x | x |

Explanation of symbols
Appearance of molded article:
○ Good, Δ Rather bad, x Bad
Fusion rate:
◉ 80% or more, ○ 50% or more,
Δ Less than 50%, x Not fused
Dimensional stability:
○ ±2% or less, — Unmeasurable
Density distribution:
○ 10% or less, — Unmeasurable
Quality:
○ Same as current thin molded article
x Improper for appraisal
Overall appraisal:
○ Same as current thin molded article
x Improper for appraisal

EXAMPLE 7

Expansion-molded articles were obtained in the same way as in Example 1 except that after heating the pre-expanded beads to a preheated temperature of 110° C., introduction of water vapor was continued so as to keep the temperature at that level for 25 seconds for steaming and then heating being continued for 15 seconds without water removal.

EXAMPLE 8

Expansion-molded articles were obtained in the same way as in Example 7 except that after heating the pre-expanded beads to a preheated temperature of 113° C., introduction of water vapor was continued so as to keep the temperature at that level for 20 seconds (steaming step I) and then for further 5 seconds with supply of water vapor stopped (steaming step II).

EXAMPLE 9

Expansion-molded articles were obtained in the same way as in Example 7 except that the thickness of the aluminum mold was changed to 150 mm, the steaming time was changed to 10 seconds and the heating time was changed to 10 seconds.

EXAMPLE 10

Expansion-molded articles were obtained in the same way as in Example 8 except that the thickness of the aluminum mold was changed to 300 mm and the time of the steaming step I was changed to 15 seconds and the time of steaming step II was set to 5 seconds.
Comparative Example 5
Expansion molded articles were obtained in the same way as in Example 7 except that the preheating and heating temperatures were changed.
Comparative Example 6
Expansion-molded articles were obtained in the same way as in Example 7 except that steaming was dispensed with.

Of the expansion-molded articles obtained in the aforementioned Examples 7-10 and Comparative Examples 6-7, appearance of expansion-molded articles immediately after molding, fusion ratio, dimensional stability, density distribution and quality were evaluated and further overall appraisal was made. The results were as shown in Table 2.

TABLE 2

|  |  | Example 7 | Example 8 | Example 9 | Example 10 | Comparative Example 5 | Comparative Example 6 |
|---|---|---|---|---|---|---|---|
| Molding conditions | Resin | Polyethylene | Polyethylene | Polyethylene | Polyethylene | Polyethylene | Polyethylene |
|  | Thickness of molded articles | 500 mm | 500 mm | 150 mm | 300 mm | 500 mm | 500 mm |
|  | Conditions | B-1 | B-2 | B-1 | B-1 | — | — |
|  | Preheating step | 110° C. | 113° C. | 110° C. | 113° C. | 125° C. | 110° C. |
|  | Steaming step | 25 sec | I: 20 sec<br>II: 5 sec | 10 sec | I: 15 sec<br>II: 5 sec | 25 sec | — |
|  | Heating | 119° C.<br>15 sec | 119° C.<br>15 sec | 119° C.<br>10 sec | 119° C.<br>15 sec | 130° C.<br>15 sec | 119° C.<br>15 sec |
| Quality | Appearane of molded article immediately after molding | ○ | ○ | ○ | ○ | ○ | Δ |
|  | Fusion ratio | ○~◉ | ○ | ○~◉ | ○~◉ | x | x |
|  | Dimensional stability | ○ | ○ | ○ | ○ | — | — |
|  | Density distribution | ○ | ○ | ○ | ○ | — | — |
|  | Quality | ○ | ○ | ○ | ○ | — | — |

TABLE 2-continued

|  | Example 7 | Example 8 | Example 9 | Example 10 | Comparative Example 5 | Comparative Example 6 |
|---|---|---|---|---|---|---|
| Overall appaisal | ○ | ○ | ○ | ○ | x | x |

Explanation of symbols
Appearance of molded article:
○ Good, △ Rather bad, x Bad
Fusion rate:
⊙ 80% or more, ○ 50% or more,
△ Less than 50%, x Not fused
Dimensional stability:
○ ±2% or less, — Unmeasurable
Density distribution:
○ 10% or less, — Unmeasurable
Quality:
○ Same as current thin molded article
x Improper for appraisal
Overall appraisal:
○ Same as current thin molded article
x Improper for appraisal

EXAMPLE 11

Expansion-molded articles were obtained in the same way as in Example 1 except that polypropylene pre-expanded beads (lower temperature side melting point $T_{ML}=142.8°$ C. as measured by a differential scanning calorimeter, expansion ratio=30) were used and that the pre-expanded beads were heated to the preheating level of 120° C. and then left to stand for 50 seconds with introduction of water vapor stopped.

EXAMPLE 12

Expansion-molded articles were obtained in the same way as in Example 11 except that after the pre-expanded beads were headed to the preheating level of 117° C., the temperature was kept for 10 seconds with introduction of water vapor continued, thereafter steaming being continued for 20 seconds with introduction of water vapor stopped.

EXAMPLE 13

Expansion-molded articles were obtained in the same way as in Example 11 except that after the pre-expanded beads were headed to the preheating level of 117° C., the temperature was kept for 17 seconds with introduction of water vapor continued.

Comparative Example 7

Expansion-molded articles were obtained in the same way as in Example 11 except that the temperatures in the preheating step and the steaming time were varied.

Comparative Example 8

Expansion-molded articles were obtained in the same way as in Example 11 except that the steaming process was dispensed with.

Of the expansion-molded articles obtained in the aforementioned Examples 11–13 and Comparative Examples 7–8, appearance of expansion-molded articles immediately after molding, fusion ratio, dimensional stability, density distribution and quality were evaluated and further overall appraisal were made. The results were as shown in Table 3.

TABLE 3

|  |  | Example 11 | Example 12 | Example 13 | Comparative Example 7 | Comparative Example 8 |
|---|---|---|---|---|---|---|
| Molding conditions | Resin | Polypropylene | Polypropylene | Polypropylene | Polypropylene | Polypropylene |
|  | Thickness of molded articles | 500 mm | 500 mm | 500 mm | 500 mm | 500 mm |
|  | Conditions | A-1 (a) | A-2 (c) | A-2 (b) | — | — |
|  | Preheating step | 120° C. | 117° C. | 117° C. | 140° C. | 120° C. |
|  | Steaming step | 50 sec | ① 10 sec ② 20 sec | 17 sec | 25 sec | — |
|  | Water-removing step | 150 mm Hg | 150 mm Hg | 150 mm Hg | 150 mm Hg | 150 mm Hg |
|  | Heating | 140° C. 10 sec | 140° C. 10 sec | 140° C. 10 sec | 145° C. 10 sec | 140° C. 10 sec |
| Quality | Appearane of molded article immediately after molding | ○ | ○ | ○ | △ | ○ |
|  | Fusion ratio | ○~⊙ | ○~⊙ | ○~⊙ | x~△ | x~△ |
|  | Dimensional stability | ○ | ○ | ○ | — | — |
|  | Densityal distribution | ○ | ○ | ○ | — | — |
|  | Quality | ○ | ○ | ○ | — | — |

TABLE 3-continued

|  | Example 11 | Example 12 | Example 13 | Comparative Example 7 | Comparative Example 8 |
|---|---|---|---|---|---|
| Overall appaisal | ○ | ○ | ○ | x | x |

Explanation of symbols
Appearance of molded article:
○ Good, △ Rather bad, x Bad
Fusion rate:
⊙ 80% or more, ○ 50% or more,
△ Less than 50%, x Not fused
Dimensional stability:
○ ±2% or less, — Unmeasurable
Density distribution:
○ 10% or less, — Unmeasurable
Quality:
○ Same as current thin molded article
x Improper for appraisal
Overall appraisal:
○ Same as current thin molded article
x Improper for appraisal

POSSIBILITY OF INDUSTRIAL UTILIZATION

Expansion-molded articles of polyolefin synthetic resins of the present invention are obtainable by providing specific preheating and steaming steps and preferably a water-removal step in addition thereto.

The preheating step, in which supply of heat is provided by means of water vapor and the temperature of the pre-expanded beads and/or in their vicinities is measured directly and kept within their preheating temperature range, has a merit of control thereof being more precise and easier, as compared with the conventional method of controlling temperature or pressure of a heating medium.

The steaming step serves to effectively utilize the thermal energy of water vapor as heating media and to minimize the difference in temperatures between the the surface and the interior of the resin beads.

The water-removal step is provided for more efficient supply of water vapor in the heating step.

These two or three steps act cooperatively and enable supply of water vapor to the inside of the pre-expanded beads with the drop in temperature of water vapor minimized, thus enabling manufacture of large-sized expansion-molded articles of olefin synthetic resins 500 mm or more in width which has been taken as infeasible by any of the conventional methods.

We claim:

1. A method for manufacturing an in-mold expansion-molded article in which olefin pre-expanded beads having at least one melting point when determined by differential scanning calorimetry are charged into a mold closable but not closable gas-tight and the pre-expanded beads are heated with water vapor to be swelled and fused into the shape defined by the mold, comprising the steps of:
   introducing water-vapor into the mold to heat the pre-expanded beads to a predetermined preheating temperature $(T_\gamma)°$ C. below the fusion temperature of the pre-expanded beads after charging the pre-expanded beads into the mold,
   stopping the introduction of water vapor while steaming the pre-expanded beads for a predetermined time to heat the pre-expanded beads to a still higher temperature in such a manner that outer surfaces of beads fuse slightly to form a semi-molded article having spaces among the beads which allow water vapor to pass therethrough at the subsequent heating step,
   removing water vapor and/or water among the pre-expanded beads in the mold,
   introducing water vapor into the mold to raise the temperature in the mold to a level higher than said still higher temperature to thus heat and melt the pre-expanded beads to form an expansion-molded article, and
   leaving the expansion-molded article to stand in the atmosphere and/or cooling the expansion-molded article with a cooling medium.

2. A method for manufacturing an in-mold expansion-molded article in which olefin pre-expanded beads having at least one melting point when determined by differential scanning calorimetry are charged into a mold closable but not closable gas-tight and the pre-expanded beads are heated with water vapor to be swelled and fused into the shape defined by the mold, comprising the steps of:
   introducing water-vapor into the mold to heat the pre-expanded beads to a predetermined preheating temperature $(T_\gamma)°$ C. below the fusion temperature of the pre-expanded beads after charging the pre-expanded beads into the mold,
   continuing the introduction of water vapor while steaming the pre-expanded beads for a predetermined time to heat the pre-expanded beads to a still higher temperature in such a manner that outer surfaces of beads fuse slightly to form a semi-molded article having spaces among the beads which allow water vapor to pass therethrough at the subsequent heating step,
   removing water vapor and/or water among the pre-expanded beads in the mold,
   introducing water vapor into the mold to raise the temperature in the mold to a level higher than said still higher temperature to thus heat and melt the pre-expanded beads to form an expansion-molded article, and
   leaving the expansion-molded article to stand in the atmosphere and/or cooling the expansion-molded article with a cooling medium.

3. The method according to claim 2, wherein after steaming for a predetermined time with the introduction of water vapor continued for a temperature in the mold to be kept within a predetermined range below the fusion temperature of the pre-expanded beads, steaming is further continued for a predetermined time with the introduction of water vapor stopped.

4. The method according to any one of claims 1 to 3, wherein the steaming time ($T_M$) is within the following range:

$$5 \text{ seconds} \leq T_M \leq 7 \text{ minutes}.$$

5. A method for manufacturing an in-mold expansion-molded article in which olefin pre-expanded beads having at least one melting point when determined by differential scanning calorimetry are charged into a mold closable but not closable gas-tight and the pre-expanded beads are heated with water vapor to be swelled and fused into the shape defined by the mold, comprising the steps of:

introducing water vapor into the mold to heat the pre-expanded beads to a predetermined preheating temperature ($T_\gamma$)° C. below the fusion temperature of the pre-expanded beads after charging the pre-expanded beads into the mold, continuing the introduction of water vapor while steaming to proceed for a predetermined time at a temperature within a predetermined range below the fusion temperature of the pre-expanded beads, to heat the pre-expanded beads to a still higher temperature in such a manner that outer surfaces of beads fuse slightly to form a semi-molded article having spaces among the beads which allow water vapor to pass therethrough at the subsequent heating step, introducing water vapor into the mold to raise the temperature in the mold to a level higher than the said still higher temperature to thus heat and melt the pre-expanded beads to form an expansion-molded article, and leaving the expansion-molded article to stand in the atmosphere and/or cooling the expansion-molded article with a cooling medium.

6. A method for manufacturing an in-mold expansion-molded article in which olefin pre-expanded beads having at least one melting point when determined by differential scanning calorimetry are charged into a mold closable but not closable gas-tight and the pre-expanded beads are heated with water vapor to be swelled and fused into the shape defined by the mold, comprising the steps of:

introducing water vapor into the mold to heat the pre-expanded beads to a predetermined preheating temperature ($T_\gamma$)° C. below the fusion temperature of the pre-expanded beads after charging the pre-expanded beads into the mold.

confining the introduction of water vapor while steaming to proceed for a predetermined time at a temperature within a predetermined range below the fusion temperature of the pre-expanded beads, stopping the introduction of water vapor for steaming for a predetermined time while steaming to heat the pre-expanded beads to a still higher temperature in such a manner that outer surfaces of beads fuse slightly to form a semi-molded article having spaces among the beads which allow water vapor to pass therethrough at the subsequent heating step, thereafter the pre-expanded beads are further heated and fused together to form an expansion-molded article by keeping the temperature in the mold at a level higher than said still higher temperature by introduction of water vapor of higher temperature without removing water vapor and/or water among the pre-expanded beads in the mold, then leaving the expansion-molded article to stand in the atmosphere and/or cooling the expansion-molded article with a cooling medium.

7. The method according to claim 5 or 6, wherein the steaming time ($T_M$) is within the following range:

$$5 \text{ seconds} \leq T_M \leq 5 \text{ minutes}.$$

8. The method according to claim 5 or 6, wherein the olefin pre-expanded beads have two melting points when determined by differential scanning calorimeter.

9. The method according to claim 5 or 6, wherein the olefin pre-expanded beads are pretreated with an inorganic gas to raise their internal pressure before charging into the mold.

10. The method according to claim 5 or 6, wherein the olefin pre-expanded beads are compressed by means of a pressurized gas to below their apparent bulk volume before charging into the mold.

11. The method according to claim 5 or 6, in which the olefin pre-expanded beads are of polypropylene type pre-expanded beads or linear low density polyethylene type pre-expanded beads.

* * * * *

UNITED STATES PATENT AND TRADEMARK OFFICE
CERTIFICATE OF CORRECTION

PATENT NO. : 5,372,764
DATED : December 13, 1994
INVENTOR(S) : MATSUKI et al.

It is certified that error appears in the above-indentified patent and that said Letters Patent is hereby corrected as shown below:

On the cover page, Item [75], line 1, "Kiyoshi Matsuka" should read --Kiyoshi Matsuki--.

TABLE 1A, line 12 after the heading "TABLE 1A", "Appearane" should read --Appearance--.

TABLE 1A, last line, "Overall appaisal" should read --Overall appraisal--.

TABLE 1B, insert before line 9 after the heading, "TABLE 1B", the following line to be lined up directly under the entries on the preceding line --Water-removing    150 mm Hg    150 mm Hg    150 mm Hg    150 mm Hg    150 mm Hg    150 mm Hg--.

Column 14, line 41, "6-7" should read --5-6--.

Column 20, claims 8, 9, 10 and 11, "claims 5 or 6" should read --claim 1, 2, 5 or 6--.

Signed and Sealed this

Eighth Day of August, 1995

Attest:

BRUCE LEHMAN

Attesting Officer

Commissioner of Patents and Trademarks